(12) United States Patent
Driegen et al.

(10) Patent No.: US 10,096,131 B2
(45) Date of Patent: Oct. 9, 2018

(54) DIMENSIONAL ACQUISITION OF PACKAGES

(71) Applicant: Logical Turn Services Inc., Markham (CA)

(72) Inventors: Paul Driegen, Markham (CA); Adam Stevenson, Markham (CA); Kirk Serjeantson, Markham (CA); David Short, Markham (CA); Brian Glancy, Markham (CA)

( * ) Notice: Subject to any disclaimer, the term of this patent is extended or adjusted under 35 U.S.C. 154(b) by 32 days.

(21) Appl. No.: 15/276,145

(22) Filed: Sep. 26, 2016

(65) Prior Publication Data

US 2017/0091957 A1 Mar. 30, 2017

Related U.S. Application Data

(60) Provisional application No. 62/233,035, filed on Sep. 25, 2015.

(51) Int. Cl.
| | | |
|---|---|---|
| *G06T 7/60* | (2017.01) | |
| *G06T 7/80* | (2017.01) | |
| *G06T 7/62* | (2017.01) | |
| *G06T 3/60* | (2006.01) | |

(52) U.S. Cl.
CPC .................. *G06T 7/60* (2013.01); *G06T 3/60* (2013.01); *G06T 7/62* (2017.01); *G06T 7/85* (2017.01); *G06T 2200/04* (2013.01); *G06T 2207/10016* (2013.01); *G06T 2207/10028* (2013.01); *G06T 2207/20032* (2013.01); *G06T 2207/20221* (2013.01)

(58) Field of Classification Search
CPC .... G06T 7/60; G06T 7/62; G06T 7/85; G06T 3/60; G06T 2207/20221; G06T 2207/10016; G06T 2200/04; G06T 2207/20032; G06T 2207/10028
See application file for complete search history.

(56) References Cited

U.S. PATENT DOCUMENTS

| | | | |
|---|---|---|---|
| 8,411,080 B1 * | 4/2013 | Zimmermann | G06T 19/20 345/419 |
| 9,117,281 B2 * | 8/2015 | Hoiem | G06T 7/0081 |
| 9,779,276 B2 * | 10/2017 | Todeschini | G06K 7/1426 |
| 2003/0167229 A1 * | 9/2003 | Ludwig | G06Q 20/102 705/40 |
| 2011/0211749 A1 * | 9/2011 | Tan | G06T 7/11 382/154 |
| 2015/0063681 A1 * | 3/2015 | Bhardwaj | G06F 17/30277 382/154 |

(Continued)

*Primary Examiner* — Ming Hon
(74) *Attorney, Agent, or Firm* — Taft Stettinius & Hollister LLP

(57) ABSTRACT

The present disclosure relates to methods and systems for calculating dimensions of objects on loaded or partially loaded pallets for purposes of billing in shipping and transportation applications using depth-sensing imaging devices. A plurality of depth maps of an object are retrieved from one or more imaging devices. The depth maps are filtered and transformed into a world co-ordinate system based on calibration of the imaging devices. A point cloud is generated and a minimum volume bounding box is determined. The edge lengths and height of the object are calculated, and a volume may be determined to associate a volume with the object.

21 Claims, 14 Drawing Sheets

(56) References Cited

U.S. PATENT DOCUMENTS

| | | | |
|---|---|---|---|
| 2015/0123973 A1* | 5/2015 | Larsen | G06T 15/04 345/427 |
| 2015/0138310 A1* | 5/2015 | Fan | G06K 9/00201 348/36 |
| 2015/0279016 A1* | 10/2015 | Kim | H04N 13/0253 382/154 |
| 2015/0302594 A1* | 10/2015 | Moore | G06T 7/0057 348/47 |
| 2015/0325038 A1* | 11/2015 | Baker | H04N 13/0007 345/426 |
| 2015/0326845 A1* | 11/2015 | Liang | G06T 7/11 382/154 |
| 2017/0076459 A1* | 3/2017 | Plowman | G06K 9/4604 |

\* cited by examiner

DIMENSIONAL ACQUISITION OF PACKAGES

CROSS-REFERENCE TO RELATED APPLICATIONS

This application claims priority from U.S. Provisional Application No. 62/233,035 filed Sep. 25, 2015, the entirety of which is hereby incorporated by reference in its entirety for all purposes.

TECHNICAL FIELD

The present disclosure relates to calculating dimensions of objects each as packages on loaded or partially loaded pallets for purposes of billing in shipping and transportation applications.

BACKGROUND

In the transportation industry companies charge customers by volume (derived by dimensions—L×W×H), so there is a desire to understand the physical dimensions of each object being shipped. Without automation, these dimensions are calculated manually using conventional methods.

On the market today there are no regulatory approved systems that are cost effective for box freight or skidded freight. Laser-based dimensioned are expensive and complex. They require elaborate framing and the use of specially trained technicians to calibrate. There are also mechanical moving parts that are subject to wear and tear.

Ultrasonic sensors are less expensive but are also less accurate. It is required to manually place the parcel in a very specific location for dimensioning, lowering productivity. Because of the way they work, ultrasonic sensors cannot determine how "cubic" a shape is.

Prior attempts to develop ways of determining shipping volumes are more expensive, require more elaborate framing for their sensors and they cannot distinguish between objects. For example, they man not allow dimension on a forklift and remove its volume from the calculation.

There is therefore a need to provide a low cost product for determining volume of an object that is equal to or better than other higher cost solutions.

SUMMARY

One embodiment of the present disclosure is a method of dimensioning an object for determining shipping volumes, the method comprising: retrieving a plurality of depth maps of an object placed on a dimensioning surface from one or more depth-sensing imaging devices; filtering each of the plurality of depth maps retrieved from the one or more depth-sensing imaging devices; transforming each depth map into a world co-ordinate system in three dimensional space utilizing calibration parameters of each of the one or more depth-sensing imaging devices; generating a point cloud representing the object to be dimensioned using the transformation of the plurality of depth maps; determining edge lengths of the object; determining a height of the object; and calculating a volume of the object.

Another embodiment of the present disclosure is a system for dimensioning an object for determining shipping volumes the system comprising: one or more imaging devices configured to generate a depth map of an object; one or more processors each coupled to a respective imaging device of the one or more imaging devices, the processors for controlling the imaging devices; and a host processor coupled to the one or more processors each coupled to a respective imaging device, the host processor configured to: retrieve a plurality of depth maps of an object placed on a dimensioning surface from one or more depth-sensing imaging devices; filtering each of the plurality of depth maps retrieved from the one or more depth-sensing imaging devices; transform each depth map into a world co-ordinate system in three dimensional space utilizing calibration parameters of each of the one or more depth-sensing imaging devices; generate a point cloud representing the object to be dimensioned using the transformation of the plurality of depth maps; determine edge lengths of the object; determine a height of the object; and calculate a volume of the object.

Yet a further embodiment of the present disclosure is a non-transitory computer readable memory storing instructions, which when executed by a processor of a computing system configure the computing system to: retrieve a plurality of depth maps of an object placed on a dimensioning surface from cue or more depth-sensing imaging devices; filtering each of the plurality of depth maps retrieved from the one or more depth-sensing imaging devices; transform each depth map into a world co-ordinate system in three dimensional space utilizing calibration parameters of each of the one or more depth-sensing imaging devices; generate a point cloud representing the object to be dimensioned using the transformation of the plurality of depth maps, determine edge lengths of the object; determine a height of the object, and calculate a volume of the object.

Other aspects and features will become apparent to those ordinarily skilled in the art upon review of the following description of specific embodiments of the disclosure in conjunction with the accompanying figures.

BRIEF DESCRIPTION OF THE DRAWINGS

Further features and advantages of the present disclosure will become apparent from the following detailed description, taken in combination with the appended drawings, in which.

It will be noted lint throughout the appended drawings, like features are identified by like reference numerals.

DETAILED DESCRIPTION

Figure 1:
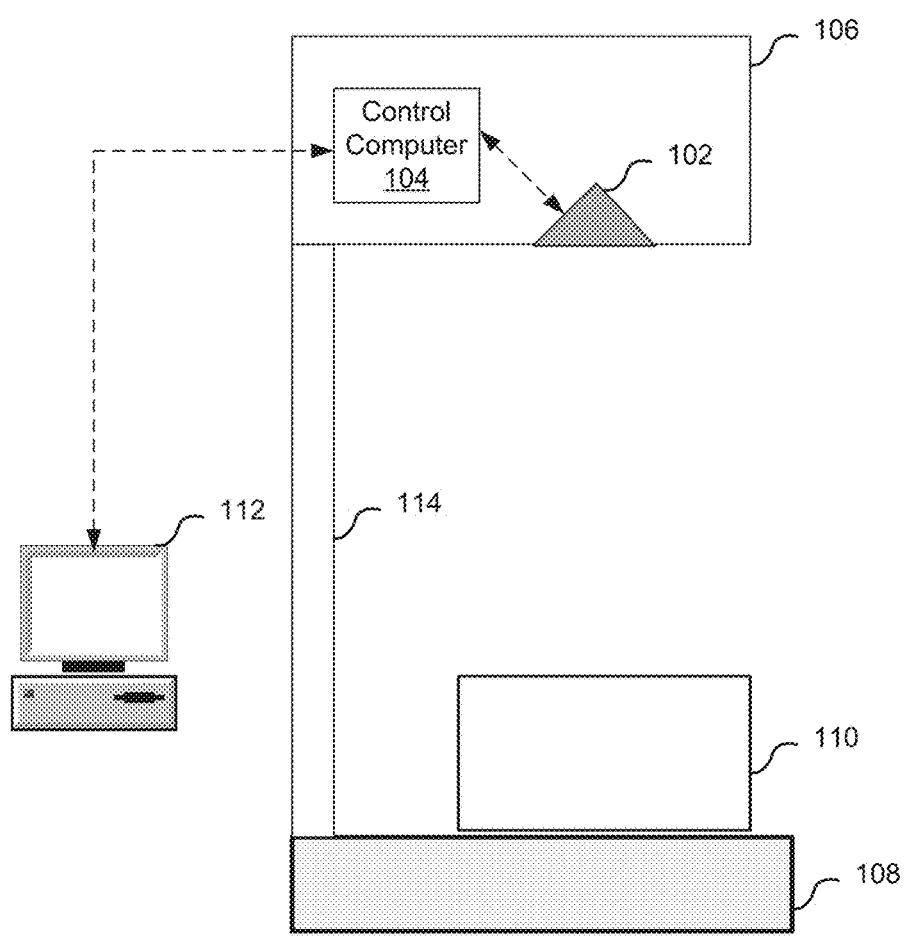
FIG. 1 shows a representation of the dimensioning system in accordance with an embodiment of the present disclosure.

The following description is presented to enable a person skilled in the art to make and use the disclosure, and is provided in the context of a particular application and its requirements. Various modifications to the disclosed embodiments wilt be readily apparent to those skilled in the art, and the general principles defined herein may be applied to other embodiments and applications without departing from the scope of the disclosure. Thus, the present disclosure is not intended to be limited to the embodiments provided, but is to be accorded the widest scope consistent with the principles and features disclosed herein.

Embodiments are described below, by way of example only, with referring to FIGS. 1-13.

The disclosed system leverages different technology that allows for determination of the volume of objects. For the transportation industry the disclosed system permits venous options for dimensioning pallets, including but not limited to:

Using a forklift to drop the pallet like other solutions on the market today

Being able to dimension pallets without dropping the pallet by dimension the entire object but recognizing the forklift and removing it from the volume calculation Driving a forklift through a funnel of sensors to acquire dimensions (same as above but in motion)

Mounting the sensors to the forklift to acquire dimensions

The system disclosed captures real-world dimensions of a physical object such as a package using one or more depth sensing cameras for example ranging, infrared laser and CMOS sensor, flash lidar, time-of-flight (ToF), and RGB-D cameras. A depth-sensing camera is one capable of generating a depth map of the scene to which it is oriented. A depth map is a bitmap data structure, where a bitmap is a type of memory organization used to store digital images. It can be thought of as a matrix where the height and width are equal to the dimensions of the digital image.

When dealing with color images each element of the matrix represents the color of the pixel at that position. A depth camera generates bitmaps exactly as a color camera does, except each element of the resultant bitmap contains a depth value representing the distance of that element from the camera rather than a color.

These are multiple existing techniques being used in depth sensing cameras today to create depth maps such as for example Microsoft™ Kinect™ v2 sensor. It uses a sophisticated infrared (IR) technique to generate depth maps at 512×424 resolution at 30 frames/second. Stereoscopic camera system such as one offered by Stereolabs™ may be utilized which can also generate depth maps in real time using a completely different technique.

The main difference between the two is the technology used to create the depth map. As mentioned the Kinect sensor uses an infrared (IR) technique, whereas a stereoscopic camera uses multiple cameras to capture stereo images and computes depth based on the deltas between the left and right images. A major advantage of the IR based solution is that it is not dependent on ambient light like a standard camera system would be. However, IR based cameras suffer from some limitations of IR, namely that it reflects poorly from certain surfaces (i.e. glossy black surfaces).

The methods and systems described herein may be implemented using depth sensing cameras such as either IR based cameras or stereoscopic cameras. Whenever the term "camera" referenced, it is referring to any depth sensing imaging device capable of meeting our accuracy requirements.

FIG. 1 shows a representation of the dimensioning system using an exemplary case of a single imaging device setup 100 having only a single camera 102. The camera 102 is connected to a control computer 104 executing dimensioning software stored in memory and executed by a processor capable of calculating the object dimensions. Optionally, the control computer 104 is connected to a serial-port weigh scale integrated with the dimensioning surface 108.

One or more cameras 102 are mounted within an enclosure 106 connected to a frame 114, the enclosure 106 is positioned overhead of the flat dimensioning surface 108. If a scale is used, the scale can be used as the dimensioning surface; otherwise any flat surface can be used. The object 110 to be dimensioned is placed on the dimensioning surface 108 and the software on the control computer 104 calculates the object 110 dimensions. The dimensions then appear on a connected output display 112 (monitor), connect to the control computer 104 either directly or through a network.

Custom software running on the control computer 104 retrieves the depth map from the camera 102 and creates a 3D reconstruction of the scene by calculating a 3D transformation of the depth maps. This reconstruction is referred to as a point cloud.

The point cloud is analysed to locate the object and calculate its dimensions (length/width/height) within 0.2 inches. The control computer 104 is capable utilizing a number of different configuration parameters that determine its behaviour. These include:

Calculating average or maximum height of an object

Calculating average on maximum edge lengths (length/width) of an object

Static/Dynamic tolerances for determining how "cuboidal" an object is.

In an embodiment of the present subject matter, the object being dimensioned may also be scanned by a barcode reader or the camera itself to determine stepping information of the object such as the destination, recipient, etc. Once the volume of the object is determined, the volume can be associated with this shipping information to assist With billing systems are associated with a pallet that the package or objects are to be associated with.

Figure 2:
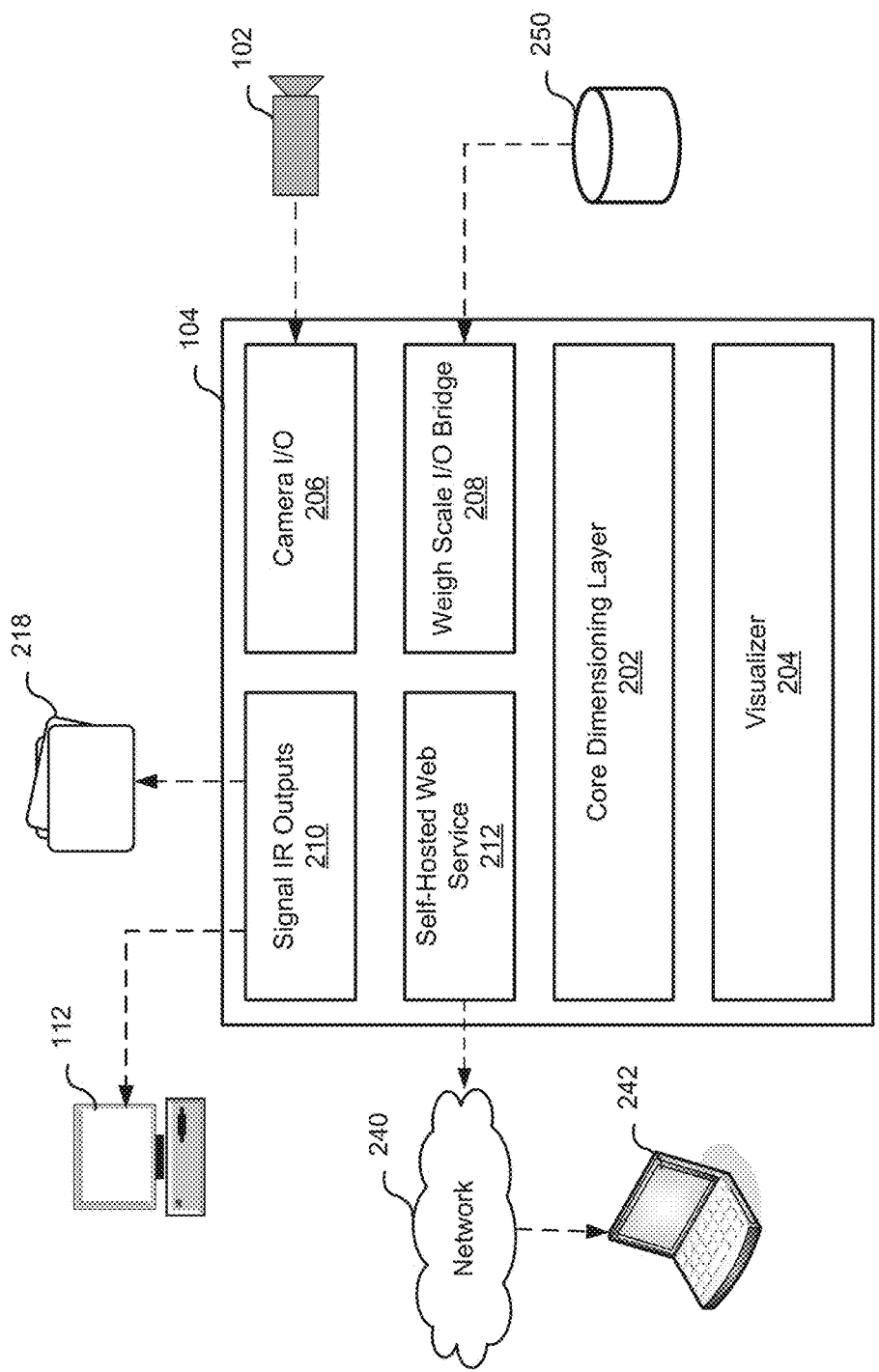
FIG. 2 shows a representation of the software-architecture of the dimensioning system.

FIG. 2 shows a representation of the software architecture of the dimensioning system.

In addition to the single imaging device setup 100 shown in FIG. 1, where a single depth camera is mounted overhead of a flat dimensioning surface oriented so that it is exactly perpendicular to the surface, this may not be suitable for larger objects so a multi-sensor camera configuration may be used.

Figure 3:
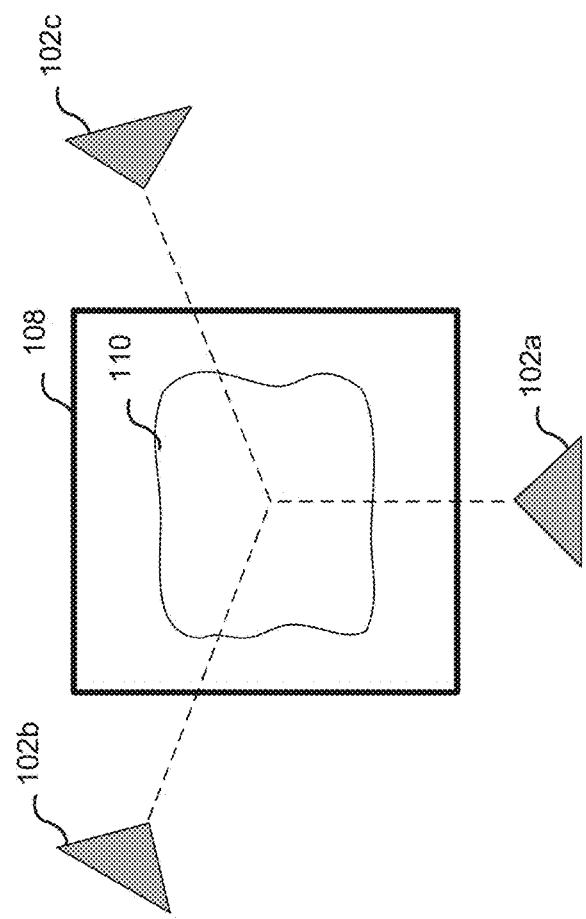
FIG. 3 shows a top view of mufti-imaging device configuration.

FIG 3 shows a top view of multi-imaging device configuration A multiple sensor setup where two or three cameras, 102a, 102b, 102c, are mounted at orientations that surround the object to be dimensioned 110 may be considered. The cameras 102a, 102b, 102c, are positioned above the dimensioning surface 108 and slightly offset from center, oriented so that each is aiming directly at the center of dimensioning surface 108 to surround the object 110 to be measured.

Figure 4:
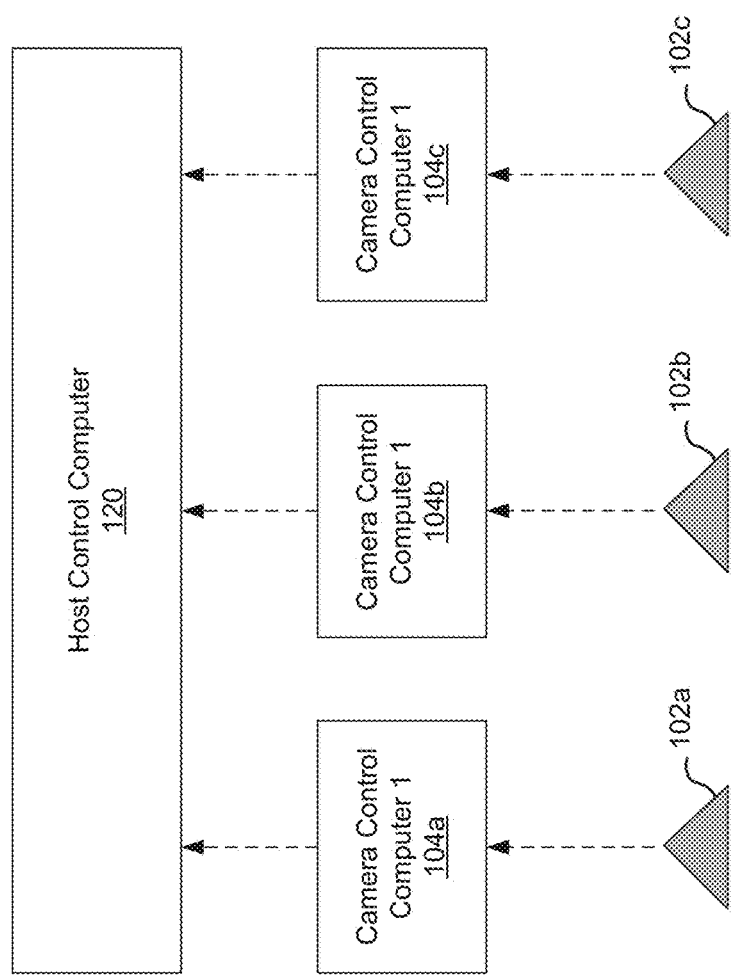
FIG. 4 shows hardware required in a multi-imaging device setup.

FIG. 4 shows hardware required in a multi-imaging device setup. Note that in a multi-sensor setup each camera 102a, 102b, 102c may have its own dedicated control computer 104a, 104b, 104c. Each of the control computers 104a, 104b, 104c forward on the captured depth maps to the host control computer 120 which will perform the necessary dimensioning calculations in the case of a single imaging device as shown in FIG 1, the camera 102 is still connected to the control computer 104. This control computer 104 may carry out the object dimensioning, or may still forward the captured depth maps to a separate host control computer 120.

For any type of configuration, the system must be calibrated in order to understand the camera's position and orientation in real-world space. FIG. 5 shows a calibration setup for a single imaging device system In a single sensor configuration, the camera 102 is mounted directly overhead of the dimensioning surface 108.

The system must determine exactly how much distance lies between the dimensioning surface 108 and the camera 102 in order to find zero plane. It does this by generating depth maps of the dimensioning surface 108 using camera 102, retrieving these depth maps from the camera 102, creating a 3D point cloud from if end attempting to locate geometric planes using a Random Sample Consensus (RANSAC) algorithm. Once a plane has been extracted from the date, it can be used to determine exactly how far the dimensioning surface 108 is from the camera 102.

The exact orientation of the camera 102 relative to the dimensioning surface 108 may also be determined. For the system to be accurate, a vector V extending straight down the Z axis of the earners 102 most be within 1 degree of the plane normal N 130. That is, the dot product of the two vectors (normalized) must be <1 degree. The dot product is given by the following formula:

$$V \cdot N = |V||N| \cos \theta$$

Provided |V| and |N| are both 1 (as V and N are both unit length vectors), the result is simply $\cos\theta$, which must be <1 degree.

Figure 5A:
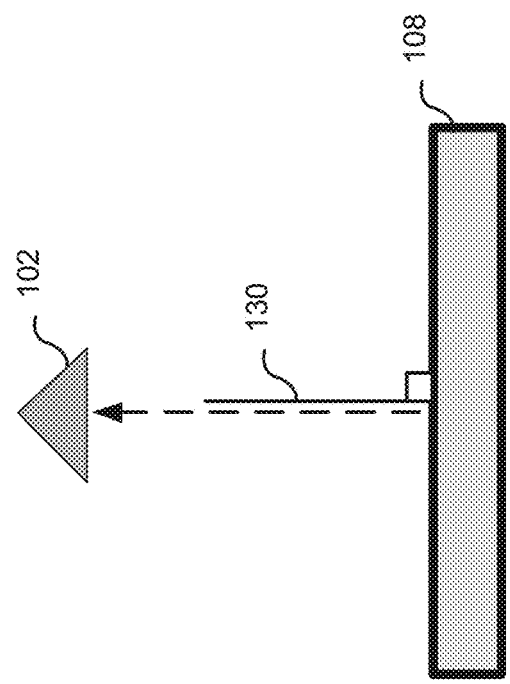
FIG. 5 A and B shows a calibration setup for a single imaging device system.
Figure 5B:
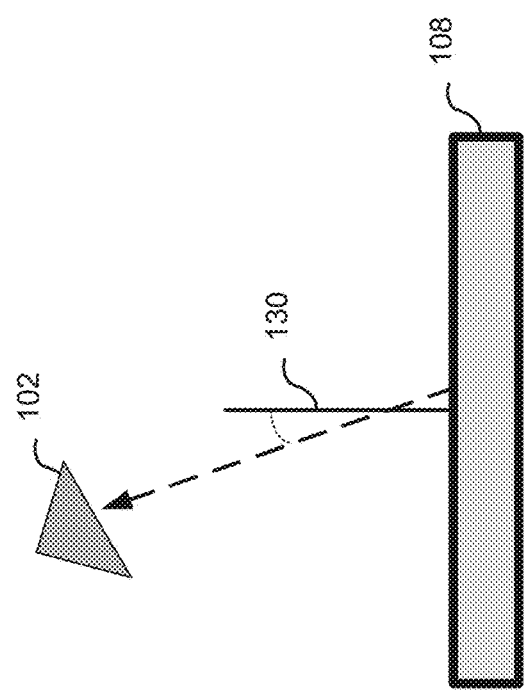

This is shown in FIG 5, where FIG. 5A shows an incorrect setup calibration for a single camera where the camera 102 is not positioned parallel to the dimensioning surface 108 and is offset from the plane normal N 130. FIG. 5B shows the correct calibration when the camera 102 is parallel to the dimensioning surface and in line with the plane normal N 130.

Figure 6A:
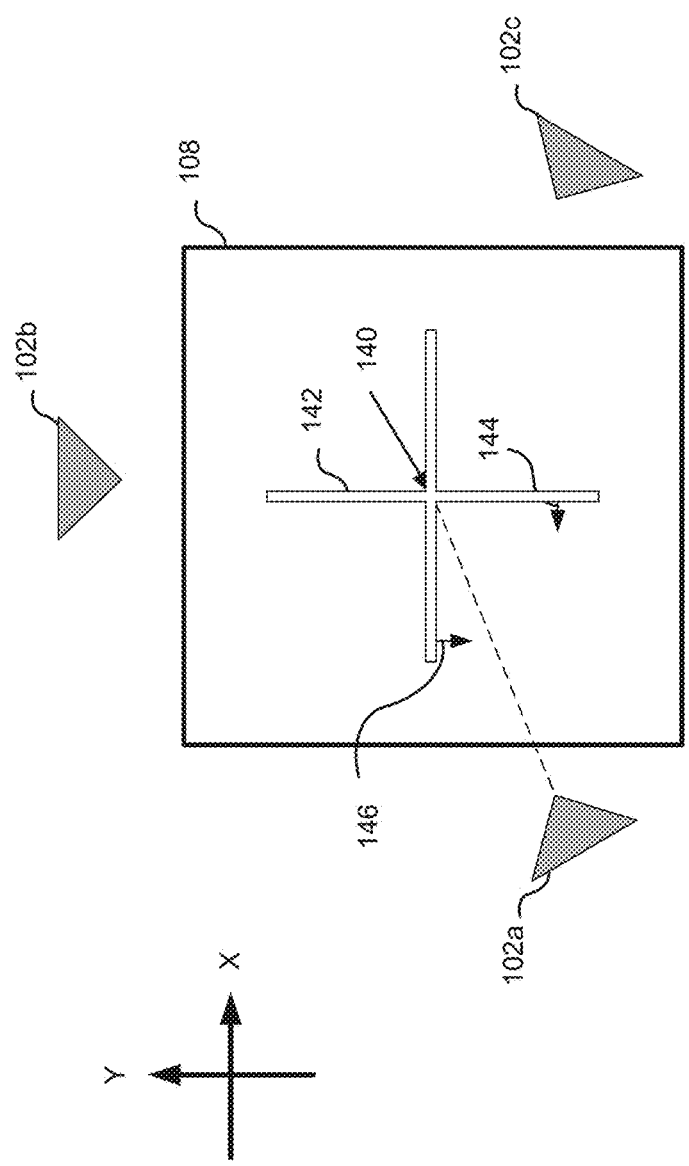
FIG. 6 A and B show a top view and a side view of multi sensor calibration setup respectively.
Figure 6B:
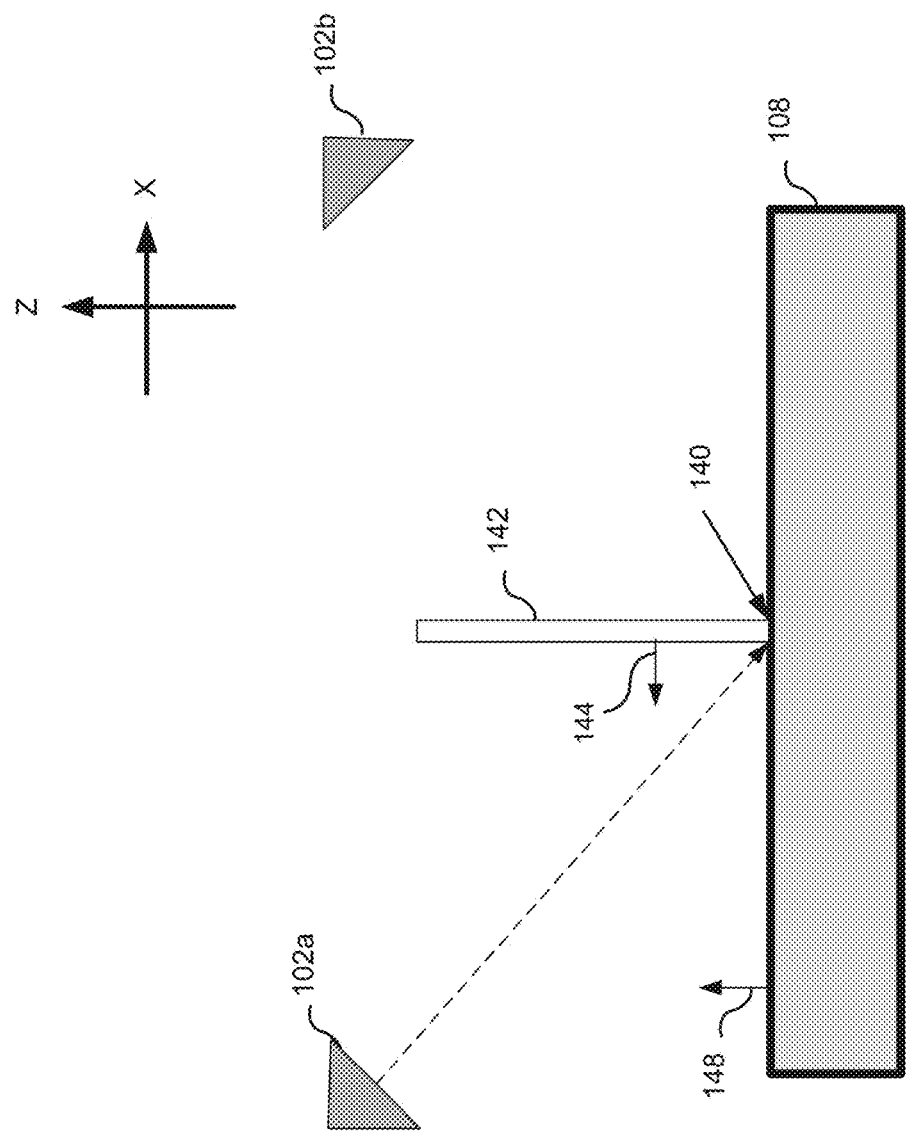

FIG. 6A and 6B show a top view and a side view of multi-sensor calibration setup respectively. In a multi-sensor configuration, each camera 102*a*, 102*b*, 102*c*, is positioned above and slightly offset from center, oriented such that it is aiming directly at the center of the dimensioning surface 108. In a multi-sensor configuration, the depth map from each camera 102*a*, 102*b*, 102*c* will be combined in by the host control computer 120 to form a combined point cloud as described with respect to FIG. 4. This necessitates that a multiple coordinate system is utilized. The control computer 104*a*, 104*b*, 104*c* attached to each respective camera 102*a*, 102*b*, 102*c*, will process camera date according to local camera space coordinates, but the host control computer 120 that combines data from all cameras 104*a*, 104*b*, 104*c*, must transform each camera's depth map to a world coordinate system. From that point the dimensioning host control computer calculates dimensions from the point cloud similarly to the way it works with a single camera setup.

From a calibration perspective, each camera 102*a*, 102*b*, 102*c*, must be calibrated such that the software is aware of its exact orientation in 3D space (in a world co-ordinate system) relative to the other cameras. The calibration procedure works by having the camera identify the three planes that reside on the world space axes. These three planes should be situated so that they intersect at the world space origin 140. The three plane equations are:

X=0

Y=0

Z=0

For the plane Z=0 (the XY plane), the dimensioning surface 108 is used. The other two planes are visualized using a specially constructed calibration tool 142 that resembles a '+' is placed on the dimensioning surface 108. The '+' shape is important as it represents the intersection of the three orthogonal planes provided by the equations above and represents the world-space origin 140. The normals for the X=0 plane (the y-z plane) 144, the Y=0 plane (the x-z plane) 146, and the Z=0 plane (the x-y plane) 148 are shown in FIG. 6A and 6B. The calibration tool provides a 3-D structure of at least 10 inches such that it's enclosing rectangle would have edge lengths of 36 inches. If should also be about 36 inches high essentially making it 36 inches cubed. The "plus" or "cross" shape represents the intersection of 2 orthogonal planes in 3D space. The center of the shape is be placed at the positron in real world space in that represents the coordinate system origin and XYZ axis orientations the sensors. Each sensor is able to detect these planes and based on the angles it can then determine its own position relative to that object. The host computer 120 utilizes the information from each sensor in order to understood how to transform the point cloud it receives from each one.

The camera 102*a* is calibrated by having the control computer activate the camera, capture a series of depth maps and within them identify the three geometric planes using an implementation of the RANSAC algorithm.

Provided the calibration tool 142 was oriented to the world-space axes, the software can new determine the distance and orientation of the camera 102*a*. When all cameras 102*a*, 102*b*, 102*c*, are correctly calibrated the dimensioning software will be able to construct a single point cloud from each of the camera depth reaps In other words, the software can retrieve a depth map taken in a local imaging device space of an imaging camera, and based on the calibration transform the depth map into the world co-ordinate system so that the multiple depth maps from the various cameras can be property aligned.

Figure 7:
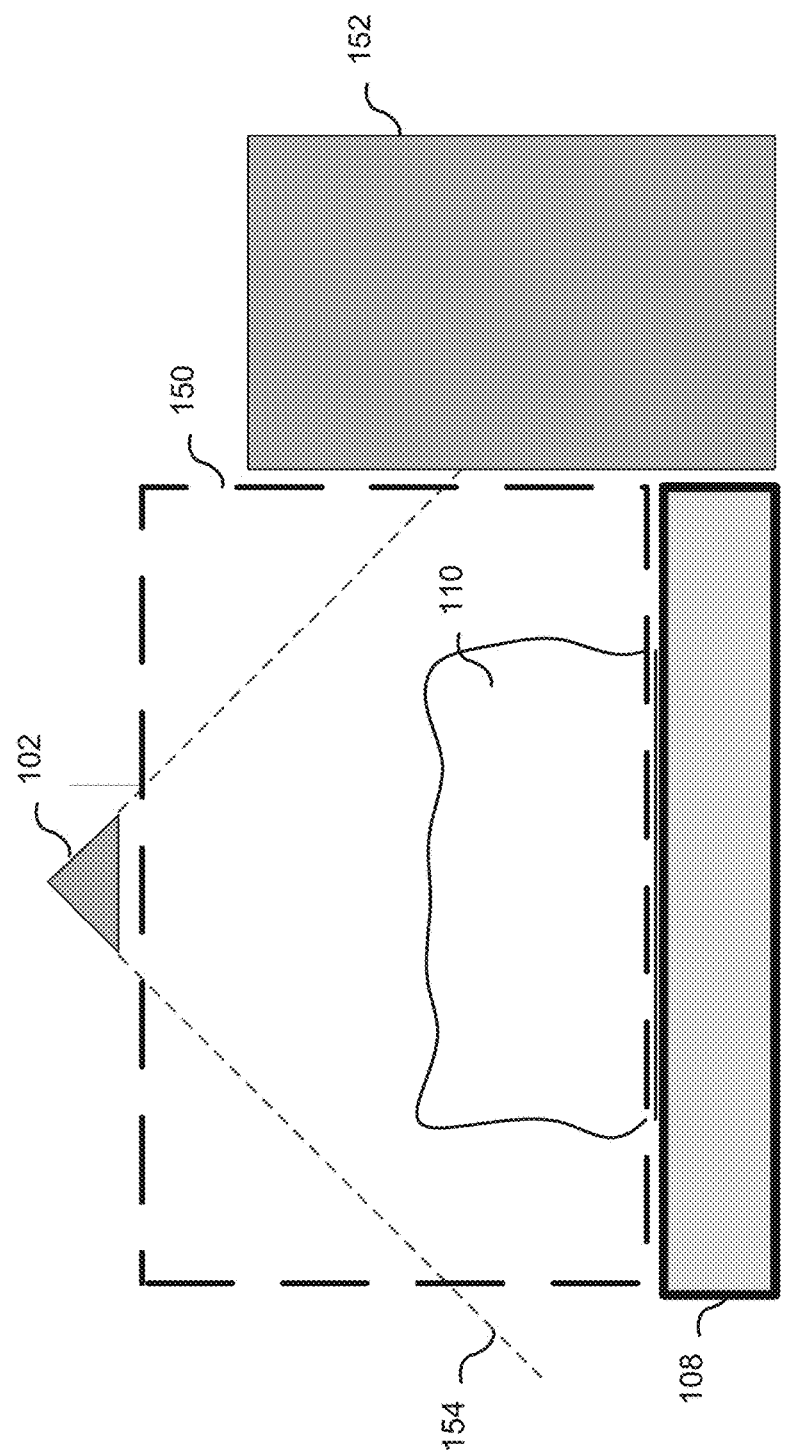
FIG. 7 shows a defined bounding volume.

By default a sensor will capture and process everything within its viewport, including unwanted surrounding objects. Generally, this is not desirable as there may be obstructions or other objects 152 captured in the viewport that are not part of the object to be dimensioned. To overcome this defect, a bounding volume may be used for dimensioning the object. FIG. 7 shows a defined bounding volume 150 in two-dimensions. One of skill in the art will readily be able to apply this concept to higher dimensions.

The bounding volume 150 is a 3D hexahedron aligned to the world co-ordinate system. The software will only consider points that reside Inside the bounding volume 150. Accordingly a surrounding object 152 located within the camera 102 line viewport 154 but outside of the bounding volume 150 would not be considered when determining the volume of the object 110. The bottom plane of the bounding volume 150 should be set to be just above the dimensioning surface 108 to exclude any points residing on the surface itself. It should also be configured so that if is empty when no object 110 is placed on the dimensioning surface 108. When an object 110 is placed on the dimensioning surface 108, every point within the bounding volume 150 can be attributed to the object to be dimensioned 110. In order for an object 110 to be correctly dimensioned, it must be completely contained in the bounding volume 150. The bounding volume 150 may also be adjusted to compensate for a pallet, or may be inducted in the volume calculation.

Figure 8A:
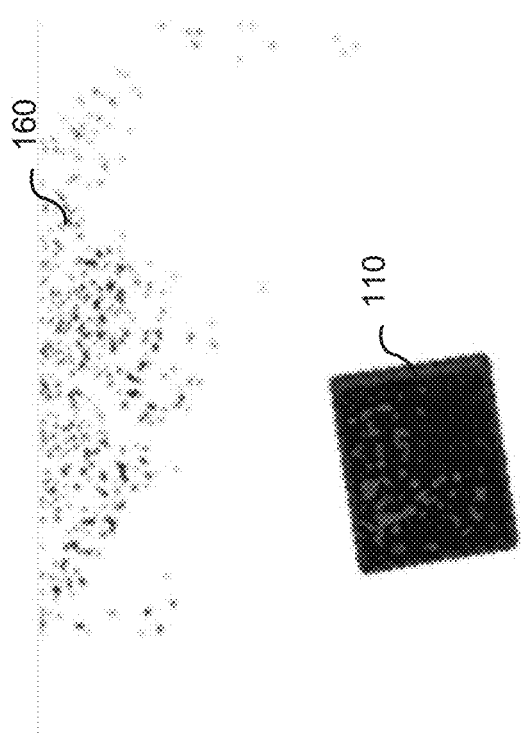
FIG. 8 A and B shows the effect of the median filter.
Figure 8B:
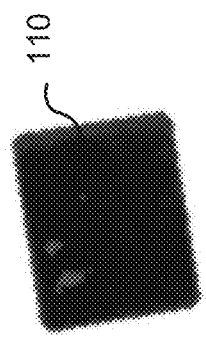

FIG. 8A and 8B shows the effect of a median filter. Once the system is calibrated and configured, dimensioning can occur when an object 110 is placed within the bounding volume 150. A series of depth map frames are retrieved from the camera 102. The exact number of frames to capture is a configuration setting, but a non-limiting example of 6-10 frames typically yields acceptable results. Each frame is filtered using a Median filter to smooth out grainy outliers in the depth map FIG. 8A shows a depth map of the object 110 With noise interference 160. FIG. 8B shows a depth map of the object 110 after the median filter has been applied.

An averaging algorithm is applied against all frames to produce a single "moving average" frame. A 3D Transformation of the output frame is created by transforming each point in the frame into 3D space.

In a single camera setup, the world-space coordinate system is setup so that the camera focal point is the world space origin 140. That is, the camera 102 is always aimed at the point 0, 0, and 0 in the world co-ordinates.

In a multi-camera setup, the depth maps from each camera 102a, 102b, 102c, are transformed according to camera calibration parameters determined during the calibration. Based on the relative positions and orientations of the imaging devices 102a, 102b, 102c, the depth snaps captured by each of the imaging devices are transformed to generate a single point cloud where every point is defined in the same co-ordinate space, namely the world co-ordinate system. In this case, the world-space origin 140 is defined as being somewhere near the center of the dimensioning surface 108, and all transformation calculations must take this into account The transformation is performed by applying a reverse transform on the points captured from each camera, where the amount of translation/rotation required is the inverse of each camera's location/orientation. Therefore, the point cloud generated by the multi-camera setup is no different than what is generated by the single camera setup in that a single point cloud is produced in the world co-ordinates, though inherently a different amount of data would be captured by the multi-camera setup than the single camera setup.

Figure 9:
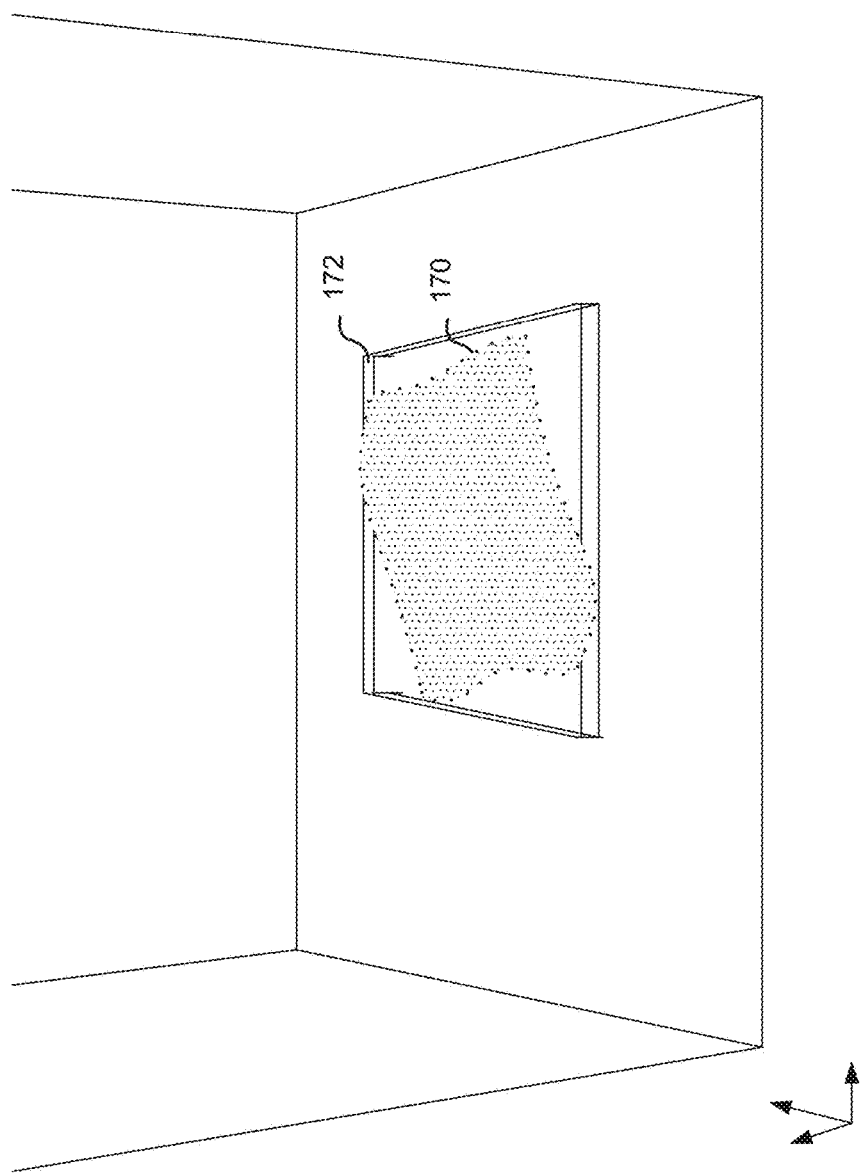
FIG. 9 shows a point cloud representation.

The result forms the point cloud data structure. A visual example of a point cloud 170 representing an object 110 taken from a single imaging device configuration is shown in FIG. 9.

To calculate the overall dimensions and volume of the object 110, it is necessary to calculate the edge lengths of the object 110. The edge lengths are determined by first translating the point cloud to be at the center of the world co-ordinate system, and then using a simplified variant of the "moving calipers" algorithm to determine a minimum volume bounding box 172 of a convex hull. The algorithm entails rotating the point cloud about its center 1 degree at a time from 0 to 90 degrees around the Z axis in the world co-ordinate system. The Z axis is normal to the dimensioning surface 108.

At each rotation interval, a bounding box aligned with axes of the world co-ordinate system is calculated for all points. The area (L×W) of the front face (camera-facing) of the box is captured and compared with the current minimum. If the calculated area at a given rotation angle is less than the current minimum calculated area, this becomes the new minimum. The rotation angle associated with the minimum calculated area bounding box is stored as the object "rotation angle". The front face of the minimum bounding box calculated in the above is stored as the bounding rectangle.

The edge lengths of the minimum bounding rectangle calculated above represent the maximum edge lengths (width and length dimensions) of the object. The height of the object 110 can be determined by calculating a first vertical distance between a position in the vertical axis of the world co-ordinate system and the dimensioning surface 108 (which may be determined during calibration), calculating a second vertical distance between the position in the vertical axis of the world co-ordinate system and the front face of the object 110, and then calculating the difference between the first and second vertical distances, the result being the height of the object 110. The position in the vertical axis may be the camera 102 in the single camera setup, or may be in a plane that the cameras 102a, 102b, 102c, are located in for a multi-camera setup. Based on these dimensions, a volume of the object 110 can be calculated as the product of the length, width, and height dimensions of the object determined.

The point cloud may also be analysed to determine variances in height and edge lengths to determine if an object can be considered a cuboid or not. The aggressiveness of the algorithm to calculate if an object is cuboidal can be configured in the software.

Rarely are real-world objects perfectly square or cuboidal. Even parcels that are designed to be hexahedrons will warp and bend slightly when loaded. This section describes how the software can achieve more accurate measurements by using an averaging calculation on all edges.

Figure 10:
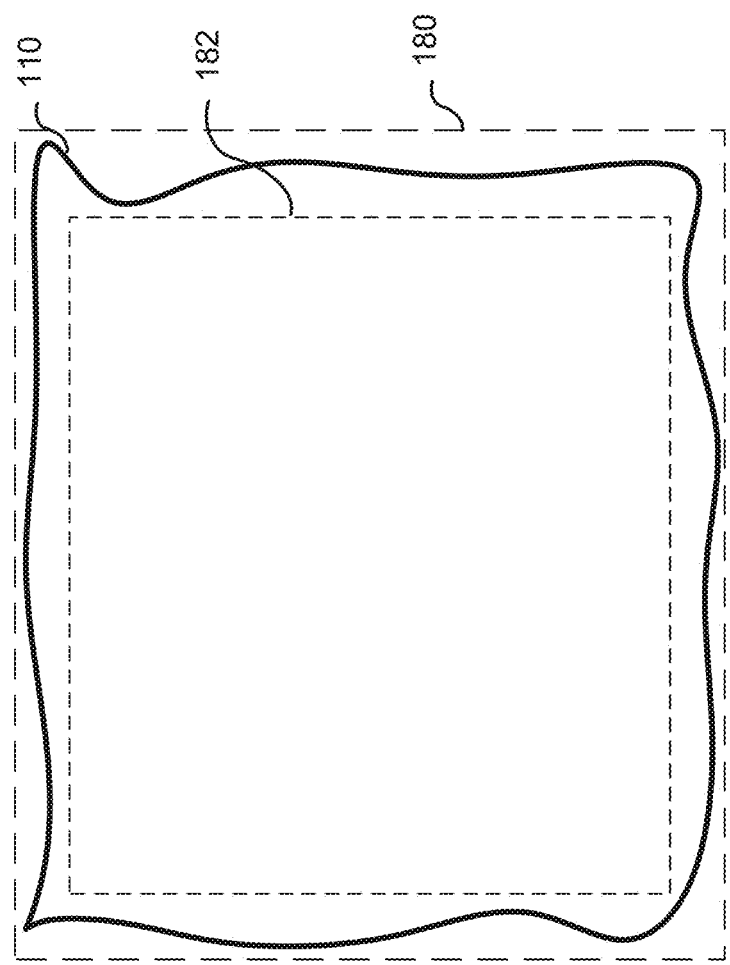
FIG. 10 shows a schematic of bounding and inset rectangles to determine if an object is cuboidal.

FIG. 10 shows a schematic of bounding and inset rectangles to determine if an object is cuboidal. After the bounding rectangle 180 is calculated as described above, an inset rectangle 182 is calculated as being a rectangle offset inwards by a certain amount from the bounding rectangle 180.

The purpose of the inset rectangle 182 is twofold. First, if provides a baseline for what is considered a cuboidal object. If an edge of the object 110 intersects an edge of the inset rectangle 182, the object 110 is not cuboidal Second, the inset rectangle 182 provides some parameters on hew to calculate the average edge lengths, which may be beneficial if the object 110 is indeed not cuboidal.

The amount of offset to use is configurable in the software. In general, as larger objects tend to be less cuboidal the system is normally configured to increase the inset rectangle offset as an object size increases.

Figure 11:
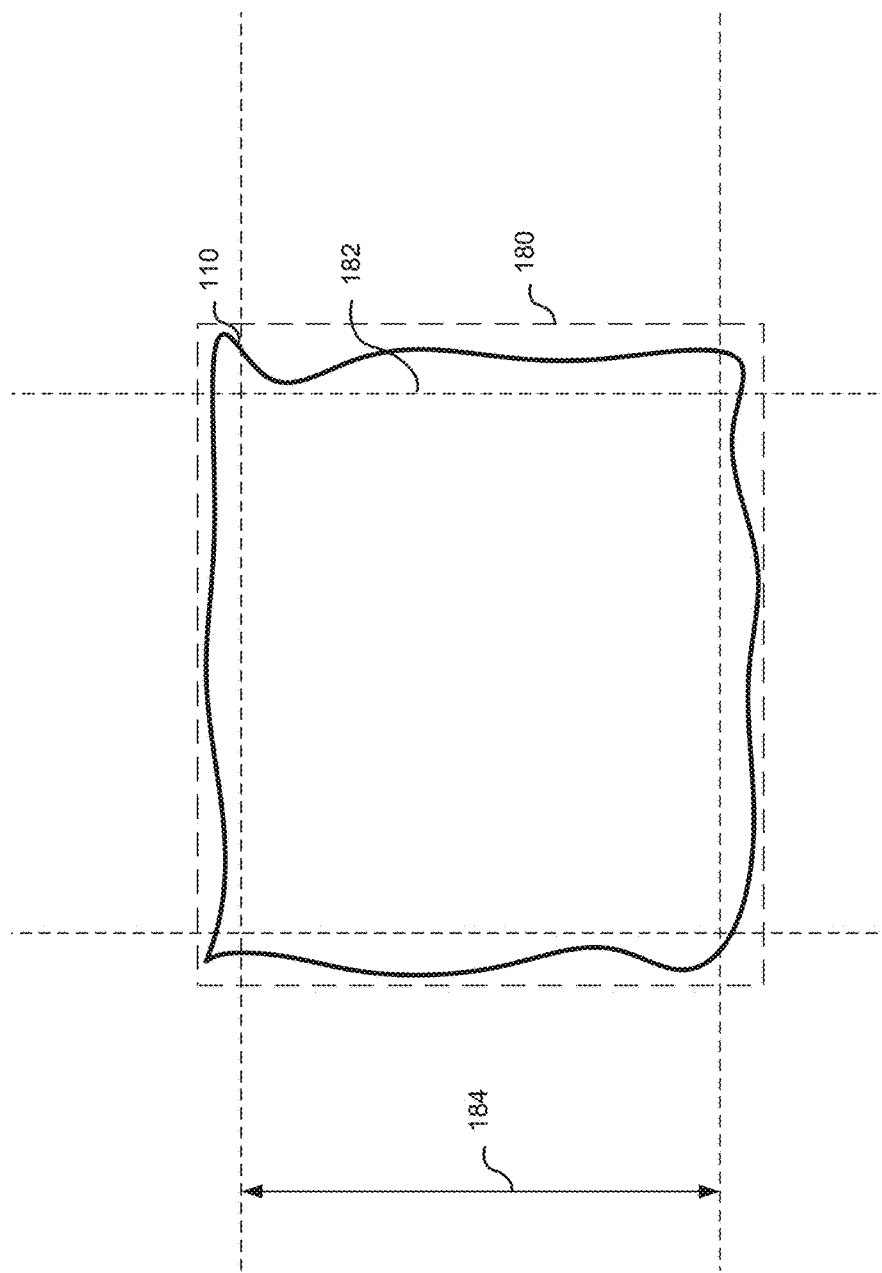
FIG. 11 shows average edge widths for determining the dimensions of an object.

To test if an object is a cuboid, a traversal algorithm traverses each point on the line segments comprising the inset rectangle 182 and retrieves the corresponding 3D point from the point cloud 170. The height (Z component) of each 3D point is stored. The minimum, maximum and average heights are stored. In short, if the delta, or difference between the minimum and maximum heights are greater than a certain threshold, the object 110 is not cuboidal. The threshold is configurable and can scale dynamically based on an objects size. In these cases, it may be better to determine the volume of the object based on average dimensions instead of the maximum dimensions described previously. FIG 11 shows average edge widths for determining the dimensions of the object. To calculate average width of an object 110, a traversal algorithm iterates each row of toe depth frame included in the inset rectangle 182 and calculates the width 184 of that row. Once completed the average width is calculated and returned. The process is then repeated for the other edge dimension.

It is important to note that the above methods for determining the edge lengths and height of the object may be performed in both a single camera setup (as shown in FIG. 1, for example), or a multi-camera setup (as shown in FIG. 3, for example). This is because determining the dimensions is achieved using the point cloud, which can be obtained using either setup as described above.

Figure 12:
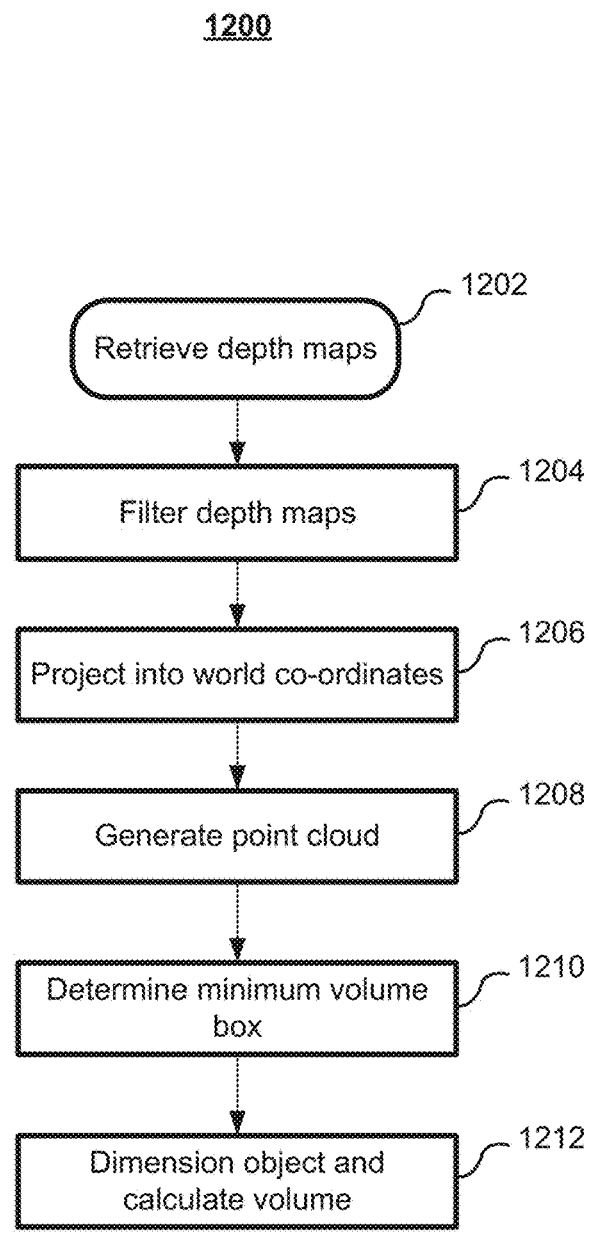
FIG. 12 depicts method flow for dimensioning an object using single or multi-imaging device configurations.

FIG. 12 depicts a method flow 1200 for dimensioning an object using single or multi-imaging device configurations. The method flow starts by retrieving a plurality of depth maps of an object pieced on a dimensioning surface (1202). These depth maps could be retrieved from a single imaging device or from a plurality of imaging devices. The depth maps are retrieved by a camera control computer, and may then be sent to a host control computer, especially in the multi-imaging device scenario. A filter is applied to the depth maps (1204) to smooth out grainy outliers in each of the plurality of depth maps. This may be achieved by a Median filter, for example. The depth maps receded from each of the one or more imaging devices are transformed into a world co-ordinate system (1206) as each imaging device may be oriented at an angle relative to the object being imaged, in a space local to the individual imaging device. Therefore to combine the depth maps they must first be transformed into a common co-ordinate system. This transformation may be achieved based on a calibration of the imaging devices. Once the transformation of the depth maps has occurred, a point cloud image of the object to be dimensioned may be generated (1208). Then, as previously described, the software can determine a minimum volume box (1210) and dimension the object (1214) using the edge lengths and height of the minimum volume box. This allows for a volume of the box to be calculated.

Figure 13:
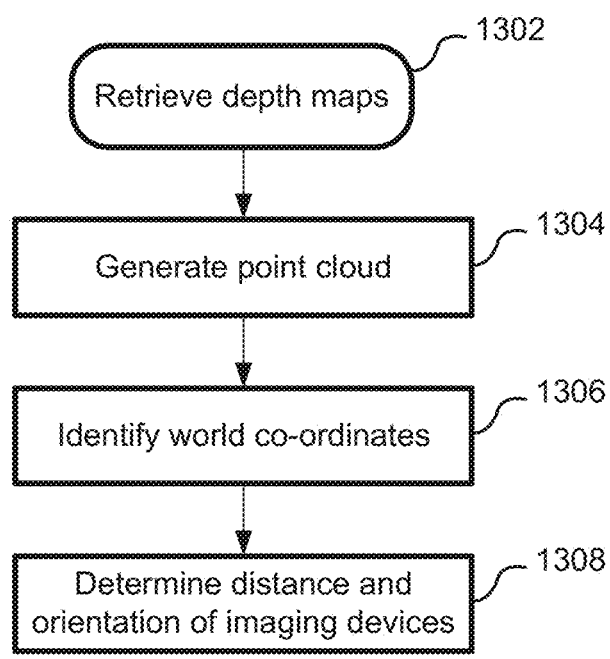
FIG. 13 depicts a method flow 400 for calibrating an imaging device prior to dimensioning an object.

FIG. 13 depicts a method flow 1300 for calibrating an imaging device prior to dimensioning an object The method flow begins by retrieving a plurality of depth maps from one or more imaging devices (1302). These depth maps would be taken prior to the object being placed on the dimensioning surface, and may include a calibration tool to assist with calibration as previously discussed. A point cloud is generated for each of the one or more imaging devices (1304). The point cloud is then used to identify world co-ordinates (1306), which is achieved by identifying the planes defining the world axes using a RANSAC algorithm as previously described. The calibration toot is used to assist with identifying these planes. For each imaging device the distance and orientation of each of the one or more depth-sensing imaging devices is determined to transform a depth map taken in a local imaging device space of the one or more depth-sensing imaging devices to the world co-ordinate system (1308). In the case of just a single imaging device setup, it may be possible for the local imaging device space to be the same as the world co-ordinate system, in which case no transformation would be necessary. The dimensioning surface may be a dedicated surface or defined area underneath the imaging devices. Alternatively the dimensioning surface may be defined by a pallet containing the objects which cars be transported by a fork lift where the calibration is performed relative to a pallet surface.

Each element in the embodiments of the present disclosure may be implemented as hardware, software/program, or any combination thereof. Software codes, either in its entirety or a part thereof may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the that the system and components shown in FIGS. 1-13 may include components not shown in the drawings. For simplicity and clarity of the illustration, elements in the figures are not necessarily to scale, are only schematic and are non-limiting at the elements structures. It will be apparent to persons skilled in the art that a number of variations and modifications can be made without departing from the scope of the invention as defined in the claims.

The invention claimed is:

1. A method of dimensioning an object for determining shipping volumes, the method comprising:
   retrieving a plurality of depth maps of an object placed on a dimensioning surface from one or more depth-sensing imaging devices using a host processor;
   filtering each of the plurality of depth maps retrieved from the one or more depth-sensing imaging devices using the host processor;
   applying a bounding volume to each of the plurality of depth maps retrieved using the host processor, the bounding volume defining a three dimensional hexahedron aligned to the world co-ordinate system and representing an allowable space for points of a depth map to be considered for dimensioning;
   transforming each depth map into a world co-ordinate system in three dimensional space utilizing calibration parameters of each of the one or more depth-sensing imaging devices using the host processor;
   generating a point cloud via the host processor representing the object to be dimensioned using the transformation of the plurality of depth maps;
   determining edge lengths of the object using the host processor;
   determining a height of the object using the host processor; and
   calculating a volume of the object using the host processor.

2. The method of claim 1, wherein the depth-sensing imaging devices are one of: ranging, infrared laser and CMOS sensor, flash lidar, time-of-flight, or RGB-D cameras.

3. The method of claim 1, wherein the filtering is performed by using a Median filter to smooth out grainy outliers in each of the plurality of depth maps.

4. The method of claim 1, wherein the calibration of the one or more depth-sensing imaging devices is performed prior to placing the object on the dimensioning surface, the calibration comprising:
   retrieving from one or more depth-sensing imaging devices a plurality of depth maps of a dimensioning surface;
   generating, a point cloud using the depth maps from each of the one or more depth-sensing imaging devices;
   identifying world co-ordinates in the point clouds taken from each of the one or more depth-sensing imaging devices; and
   determining, a distance and orientation of each of the one or more depth-sensing imaging devices to transform a depth map taken in a local imaging device space of the one or more depth-sensing imaging devices to the world co-ordinate system.

5. The method of claim 4, wherein a calibration tool having intersecting planes is placed perpendicular to the dimensioning surface, and wherein an intersection of two planes of the calibration tool represents an origin $(X,Y,Z)=(0,0,0)$ in the world co-ordinate system, where X, Y, and Z are axes in the world co-ordinate system.

6. The method of claim 5, wherein the calibration tool has total dimensions of 36" in length, 36" in width, and 36" in height.

7. The method of claim 5, wherein world co-ordinates are identified in the depth maps by identifying the intersecting planes, the planes intersecting at right angles and form a plus or cross shape.

8. The method of claim 7, wherein the intersecting planes are identified using a Random Sample Consensus (RANSAC) algorithm.

9. The method of claim 4, wherein for a single depth-sensing imaging device setup the world co-ordinate system is the same as co-ordinates in the local imaging device space.

10. The method of claim 1, wherein the bounding volume is set to be just above the dimensioning surface to exclude any points residing on the surface itself.

11. The method of claim 1, wherein the bounding volume is empty when there is no object placed on the dimensioning surface.

12. The method of claim 1, wherein determining the edge lengths comprises:
    translating the point cloud to be at a center of the world co-ordinate system;
    rotating, about a center of the point cloud, 90 degrees in rotation angles of one degree around a vertical axis of the world co-ordinate system;
    calculating, at each rotation angle, a bounding box aligned with axes in the world co-ordinate system;
    calculating, at each rotation angle, an area of a front face of the bounding box, the front face being an upper surface of the object;
    determining a minimum calculated area of the front face of the bounding box representing a bounding rectangle and a rotation angle associated with the bounding rectangle; and
    determining a length and a width of the bounding rectangle, representing a maximum length and a maximum width of the object.

13. The method of claim 12, further comprising determining if the object is cuboidal, wherein determining if the object is cuboidal comprises:
    determining an inset rectangle offset by a pre-determined amount inward from the bounding rectangle;
    traversing each point of the inset rectangle and retrieving a corresponding point from the point cloud;
    storing a determined height of the corresponding point;
    determining a minimum, maximum, and average of the height of the corresponding point for each point of the inset rectangle; and
    calculating a difference between the minimum and maximum height.

14. The method of claim 13, wherein the object is not cuboidal if the difference between the minimum and maximum height is greater than a pre-selected threshold, and if the object is not cuboidal, the method further comprising determining an average length and an average width of the object.

15. The method of claim 14 wherein determining the average length and the average width of the object comprises:
    iterating each row of the depth map included in the inset rectangle;
    calculating a length and a width of each row;
    calculating the average length and the average width based on the length and width of each row.

16. The method of claim 1, wherein determining the height of the object comprises:
    determining a first vertical distance from a point in a vertical axis of the world co-ordinate system to the dimensioning surface;
    determining a second vertical distance from the point in the vertical axis of the world co-ordinate system to a front face of the object; and
    calculating a difference between the first vertical distance and the second vertical distance.

17. The method of claim 16, wherein the point in the vertical axis of the world co-ordinate system is a depth-sensing imaging device in a single depth-sensing imaging device setup.

18. The method of claim 1, wherein for a single imaging device setup the imaging device is mounted overhead of the object and aimed at a center of the dimensioning surface, an angle between a vector from the imaging device lens to the center of the dimensioning surface and a plane normal to the dimensioning surface less than 1 degree.

19. The method of claim 1, further comprising associating the volume of the object with shipping information for the object.

20. A system for dimensioning an object for determining shipping volumes, the system comprising:
    one or more imaging devices configured to generate a depth map of an object;
    one or more processors each coupled to a respective imaging device of the one or more imaging devices, the processors for controlling the imaging devices; and
    a host processor coupled to the one or more processors each coupled to a respective imaging device, the host processor configured to:
        retrieve a plurality of depth maps of an object placed on a dimensioning surface from one or more depth-sensing imaging devices;
        filter each of the plurality of depth maps retrieved from the one or more depth-sensing imaging devices;
        applying a bounding volume to each of the plurality of depth maps retrieved, the bounding volume defining a three dimensional hexahedron aligned to the world co-ordinate system and representing an allowable space for points of a depth map to be considered for dimensioning;
        transform each depth map into a world co-ordinate system in three dimensional space utilizing calibration parameters of each of the one or more depth-sensing imaging devices;
        generate a point cloud representing the object to be dimensioned using the transformation of the plurality of depth maps;
        determine edge lengths of the object;
        determine a height of the object; and
        calculate a volume of the object.

21. A non-transitory computer readable memory storing instructions, which when executed by a processor of a computing system configure the computing system to:
    retrieve a plurality of depth maps of an object placed on a dimensioning surface from one or more depth-sensing imaging devices;
    filter each of the plurality of depth maps retrieved from the one or more depth-sensing imaging devices;
    applying a bounding volume to each of the plurality of depths maps retrieved, the bounding volume defining a three dimensional hexahedron aligned to the world co-ordinate system and representing an allowable space for points of a depth map to be considered for dimensioning;

transform each depth map into a world co-ordinate system in three dimensional space utilizing calibration parameters of each of the one or more depth-sensing imaging devices;

generate a point cloud representing the object to be dimensioned using the transformation of the plurality of depth maps;

determine edge lengths of the object;

determine a height of the object; and calculate a volume of the object.

* * * * *